April 15, 1969 O. LUTHI 3,438,505
FILTER SEGMENT FOR DISC FILTERS
Filed Jan. 27, 1967 Sheet 1 of 2
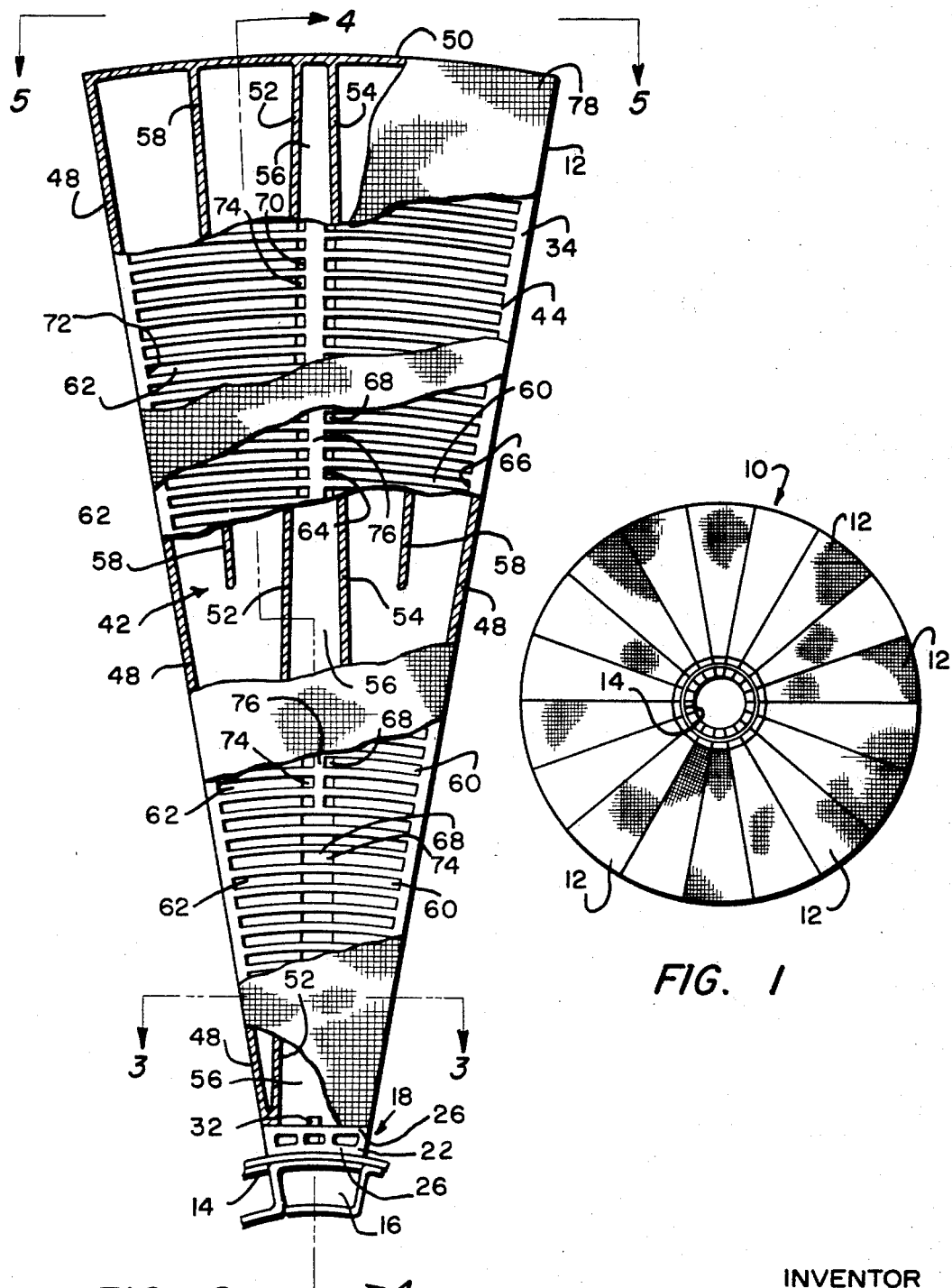
FIG. 1
FIG. 2
INVENTOR
OSCAR LUTHI
BY 
ATTORNEY April 15, 1969     O. LUTHI     3,438,505
FILTER SEGMENT FOR DISC FILTERS
Filed Jan. 27, 1967     Sheet 2 of 2
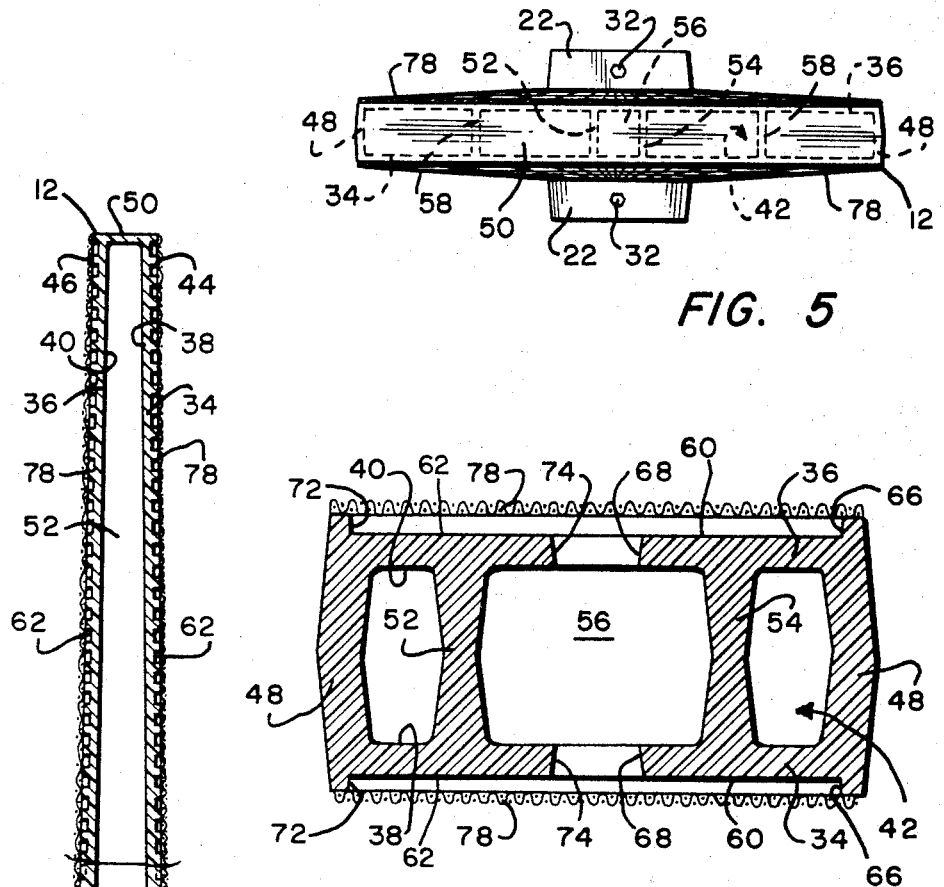
FIG. 5
FIG. 3
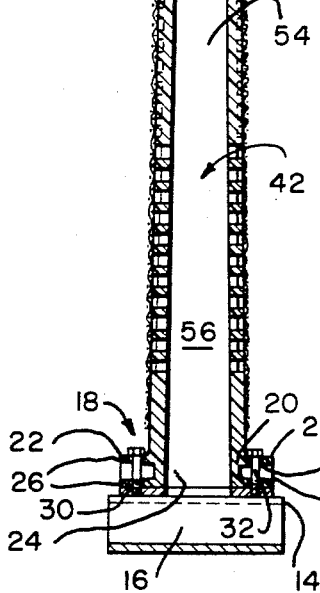
FIG. 4
INVENTOR
OSCAR LUTHI
BY
ATTORNEY

United States Patent Office

3,438,505
Patented Apr. 15, 1969

3,438,505
FILTER SEGMENT FOR DISC FILTERS
Oscar Luthi, Nashua, N.H., assignor to Improved Machinery Inc., Nashua, N.H., a corporation of Delaware
Filed Jan. 27, 1967, Ser. No. 612,127
Int. Cl. B01d 25/04
U.S. Cl. 210—486           13 Claims

ABSTRACT OF THE DISCLOSURE

A filter segment or leaf for a disc filter formed to include a pair of spaced side walls which each include a plurality of laterally extending grooves adapted to discharge into a centrally located duct means provided in the space between the side walls.

Background of the invention

The present invention relates to filtering apparatus and has more particular reference to disc filters of the type adapted for filtering a slurry such as the pulp stock employed in the manufacture of paper.

Conventionally, disc filters of the aforedescribed type generally comprise a plurality of rotatably mounted, filter discs each having stock retaining surfaces, such as screens, on their opposing side faces. The filter discs are each connected to a vacuum forming apparatus, usually a barometric leg, such that a subatmospheric pressure or vacuum is created inwardly of, and immediately adjacent, the stock retaining surfaces throughout a selected portion of the rotation of the filter discs. During the operation of the disc filters, the filter discs are partially submerged in a container of slurry and are rotatably driven whereby a coating of filtered stock is collected on each of the stock retaining surfaces as the filtrate component of the slurry is drawn through the stock retaining surfaces by the subatmospheric pressures or vacuums created by the vacuum forming apparatus.

The filter discs are each constructed from a plurality of sector-like, filter segments or leaves which are arranged in the configuration of a disc and connected at their smaller ends to a central hub. The opposing side faces of the filter segments support filter screens which cooperate to form the stock retaining surfaces of the filter discs. The filter segments, furthermore, define the channels or fluid passages in which the subatmospheric pressures or vacuums are created by the vacuum forming apparatus and through which the filtrate component of the slurry is discharged after its passage through the filter screens.

As the filter segments define the aforementioned channels or fluid passages, they inherently determine the hydraulic capacity of the filter discs which they cooperate to form. During the operation of the disc filters, however, the filter discs must include substantial hydraulic capacity per unit of filtering area, regardless of normal scale buildup, or maximum filtering efficiency will be adversely affected. Moreover, this requirement that the filter discs include substantial hydraulic capacity is becoming of increasing importance, particularly with respect to the freer slurries having a higher drainage rate, as filter discs are being constructed with progressively increasing diameters. Thus, the filter segments must be constructed to provide the filter discs with substantial hydraulic capacity and to maintain this substantial hydraulic capacity substantially regardless of normal scale buildup.

Furthermore, the barometric legs usually employed as vacuum forming apparatus for the filter discs are inherently unable to form a vacuum during the initial operation of the filter discs after each start-up. The channels or fluid passages in the filter segments should be constructed to minimize this delay in the formation of the vacuums to insure that the initial operation of the filter discs provides a satisfactory accumulation of filtered stock on the stock retaining surfaces. In addition, as the strength of the filter discs is determined by the cross-sectional strength and stiffness of their component filter segments, the latter must be constructed with a cross-sectional strength and stiffness sufficient to form the filter discs with the strength necessary for their successful operation.

An object of the present invention is to provide a new and improved filter segment which is particularly constructed and arranged to include a substantial hydraulic capacity and to maintain this substantial hydraulic capacity substantially regardless of normal scale buildup.

Another object of the invention is to provide a new and improved filter segment which is particularly constructed and arranged to minimize the aforedescribed delay in the formation of the vacuum upon start-up.

Another object of the invention is to provide a new and improved filter segment which is particularly constructed and arranged to provide a substantially uniform vacuum to its stock retaining surfaces to facilitate the accumulation of filtered stock in uniform thicknesses on the latter.

Another object is to provide a new and improved filter segment which, although relatively simple and economical in construction, is highly dependable and efficient in operation.

Summary of the invention

The aforegoing objects, and those other objects and advantages of the invention which will be apparent from the following description taken in connection with the accompanying drawings, are attained by the provision of a new and improved filter segment for a disc filter including a hub. This new and improved filter segment, generally considered, comprises a base adapted for connection to the hub, and a pair of side walls connected to the base and extending longitudinally from the base in opposed spaced relationship such that the side walls include remote faces and adjacent faces which cooperate to define a space between the side walls. A means is provided for forming a duct means which extends longitudinally in the space between the side walls from adjacent the base. A plurality of grooves are formed in the remote face of each of the side walls, the grooves in each of the side walls extending laterally to the longitudinal axis of their respective side wall and projecting to the opposing sides of the duct means such that they each include an end adjacent the duct means and an end remote from the duct means. The side walls each include port means for communicating said adjacent ends of the grooves with the duct means and are constructed such that said remote ends of the grooves are closed from communication with the space between the side walls. A port means, provided in the base, communicates with the duct means for receiving fluid from the duct means; and a screening means is disposed on the remote faces of the side walls peripherally over the grooves.

Description of the drawings

Referring to the drawings:

FIG. 1 is a partial, elevational view of a disc filter which includes a filter disc formed by a plurality of filter segments constructed in accordance with the present invention;

FIG. 2 is an enlarged elevational view, partially broken away for the purposes of illustration, of one of the filter segments shown in FIG. 1;

FIG. 3 is an enlarged sectional view taken on line 3—3 of FIG. 2, looking in the direction of the arrows;

FIG. 4 is a sectional view taken on line 4—4 of FIG. 2, looking in the direction of the arrows; and FIG. 5 is an end view taken on line 5—5 of FIG. 2, looking in the direction of the arrows.

*Description of the preferred embodiment*

Referring more particularly to the drawings wherein similar reference characters designate corresponding parts throughout the several views, FIG. 1 illustrates a partial view of a disc filter including a filter disc 10 formed from a plurality of filter segments or leaves 12 which are constructed in accordance with the present invention. The filter segments 12 are each rigidly mounted upon an annular hub 14 which is corrected through suitable conventional gearing (not shown) to a driving motor (not shown) to be rotatably driven by the driving motor. The hub 14, during the operation of the disc filter, contains a nonrotatable valving manifold (not shown) which communicates with the filter segments 12 through ports 16 formed in the hub 14 and is suitably connected to selectively create a subatmospheric pressure or vacuum in the filter segments 12 during the rotation of the hub 14.

The filter segments 12 are preferably formed from a molded plastic and are all of identical construction. More specifically, as illustrated in FIGS. 2 through 5, each of the filter segments 12 comprises a base designated generally as 18 which is formed to include a hub portion 20 and a pair of flange portions 22 which project outwardly from opposing sides of the hub portion 20. The hub portion 20 includes a flow opening or port 24 which extends through the base 18 and is adapted for communication with one of the ports 16 in the hub 14. The flange portions 22 each include a pair of ribs 26 having aligned openings 28, 30 therethrough. The filter segments 12 are individually rigidly mounted on the hub 14 with their respective port 24 in alignment with one of the ports 16 in the hub 14 by mounting bolts 32 which are located through each pair of the aligned openings 28, 30 and threadly connected in openings formed in the hub 14 in alignment with their respective openings 28, 30.

A pair of identical, sector-like, outer or side walls 34, 36, preferably molded integrally with the base 18, are connected to the opposing sides of the hub portion 20 at their small diameter ends and extend longitudinally from the hub portion 20 in opposed spaced relationship. The side walls 34, 36 include adjacent faces 38 and 40, respectively, which cooperate to define the space 42 between the side walls 34, 36 and are arranged such that, as shown in FIG. 4, the space 42 tapers in depth as it extends longitudinally from the base 18. The side walls 34, 36 also include outer or remote faces 44 and 46, respectively, which are remote from the space 42.

The side walls 34, 36 are connected along their opposing lateral edges by elongated connecting walls 48 which extend outwardly from the base 18. The connecting walls 48 are each joined along their lateral edges to the lateral edges of the adjacent faces 38, 40 of the side walls 34, 36 such that, as shown in FIG. 3, the filter segment 12 is formed with a substantially box-like cross section. The side walls 34, 36 are connected at their free ends by an arcuate connecting wall 50 which is joined along its lateral edges to the adjacent faces 38, 40 and connected at its opposing longitudinal ends to the connecting walls 48. The connecting walls 48, 50 prevent slurry from flowing into the space 42 along the lateral edges, and at the free ends, of the side walls 34, 36.

A pair of elongated baffle elements or walls 52, 54, located within the space 42, cooperate to provide a flow duct 56 which communicates with the port 24 in the base 18 and extends longitudinally in the space 42 from adjacent the base 18. The baffle elements 52, 54 are connected along their lateral edges to the adjacent faces 38, 40 of the side walls 34, 36 and, as shown in FIG. 2, are connected at their longitudinal ends to the connecting wall 50 and the respective adjacent one of the connecting walls 48. The baffle elements 52, 54 are arranged such that the flow duct 56 is centrally located along the longitudinal axis of the space 42 and tapers in width as it extends longitudinally along such axis from the base 18. The flow duct 56, due to the aforedescribed tapering in the depth of the space 42, also tapers in depth as it tapers in width.

An elongated stiffening rib 58, connected to the connecting wall 50 and projecting longitudinally from the latter towards the base 18, is provided within the space 42 intermediate the flow duct 56 and each of the connecting walls 48. The stiffening ribs 58 are connected along their lateral edges to the adjacent faces 38, 40 of the side walls 34, 36 and provide additional stiffness and strength to the filter segment 12 at their respective locations.

The remote faces 44, 46 of the side walls 34, 36 are formed of identical construction. More specifically, as illustrated in FIG. 2 wherein the remote face 44 of the side wall 34 has been shown for the purposes of illustration, the remote faces 44, 46 each include a plurality of relatively shallow grooves 60, 62 which extend laterally to the longitudinal axis of their respective one of the side walls 34, 36. The grooves 60, 62 are each formed in the configuration of concentric arcs which extend circumferentially to the base 18 and are arranged such that each one of the grooves 60 is in alignment with one of the grooves 62.

The grooves 60 extend longitudinally from the flow duct 56 towards a common one of the lateral edges of their respective side walls 34, 36 and are uniformly spaced throughout the lengths of the remote faces 34, 36. The grooves 60, furthermore, are constructed of lengths commensurate with their relative positions in the remote faces 44, 46 such that they each include an end 64 aligned with the flow duct 56 and an end 66 immediately adjacent the aforementioned one of the lateral edges. A port 68 is formed through the thickness of the side walls 34, 36, at the end 64 of each of the grooves 60 for communicating the latter with the flow duct 56. The side walls 34, 36 are constructed, however, to provide a bottom for each of the grooves 60 throughout the remainder of their lengths.

The grooves 62 extend longitudinally from the flow duct 56 towards the other of the lateral edges of their respective side walls 34, 36 and are uniformly spaced throughout the lengths of the remote faces 44, 46. The grooves 62, furthermore, are constructed of lengths commensurate with their respective positions in the remote faces 44, 46 such that they each include an end 70 which is aligned with the flow duct 56 and an end 72 which is immediately adjacent the aforementioned other of the lateral edges. A port 74 is formed through the thickness of the side walls 34, 36 at the end 70 of each of the grooves 62 for communicating the latter with the flow duct 56. The side walls 34, 36 are constructed, however, to provide a bottom for each of the grooves 60 throughout the remainder of their lengths.

The aligned grooves 60, 62 which are formed in each of the remote faces 44, 46 immediately adjacent the base 18 are connected at their adjacent ends 64, 70 and communicate with the flow duct 56 through ports 68, 74 which are similarly connected. The aligned grooves 60, 62 which are formed in each of the remote faces 44, 46 remote from the base 18, however, are separated at their adjacent ends 64, 70 by rib elements 76 and communicate with the flow duct 56 through ports 68, 74 which are similarly separated. This construction of the grooves 60, 62 and the ports 68, 74 provides the filter segment 12 with substantial flow volume for draining fluid from the grooves 60, 62 and simultaneously forms the filter segment 12 of substantial stiffness and strength.

A fine mesh screening wire, shown fragmentarily as 78 in FIG. 2, is located peripherally on each of the remote faces 44, 46 over the grooves 60, 62 therein and secured to the connecting walls 48, 50. The aforedescribed extension of the grooves 60, 62 such that their ends 66, 72 extend immediately adjacent the lateral edges of the side walls 34, 36 minimizes the possibility that failure of the screening wire 78 may occur due to its puncture adjacent the ends of the grooves 60, 62.

During the operation of the aforedescribed filter segment 12, filtered stock is collected on the screening wire 78 while filtrate flows therethrough, into the grooves 60, 62. The filtrate, thus entering the grooves 60, 62, flows through the ports 68, 74 to the flow duct 56 which directs it through the ports 16, 24 to the valving manifold in the hub 14.

The flow duct 56, as is believed to be apparent from the aforegoing description, provides the filter segment 12 with substantial hydraulic capacity and insures that a substantially uniform vacuum or subastmospheric pressure is maintained throughout the length of the filter segment 12. The filtrate flowing through the flow duct 56 upon start-up creates a vacuum sufficient to start the formation of the coating of filtered stock on the screening wire 78 and thus minimizes the delay in the formation of the vacuum upon start-up. Scale buildup in the flow duct 56 reduces the hydraulic capacity of the filter segment 12 only by a minimal amount and can be easily and simply removed without the necessity for a prior removal of the screening wire 78.

From the aforegoing, it will be seen that I have provided new and improved means for accomplishing all of the objects and advantages of my invention. It will be understood, however, that, although I have hereinbefore illustrated and specifically described only a single embodiment of my invention, my invention is not limited merely to this specifically described embodiment but rather contemplates other embodiments and variations employing the principles and concepts of my invention.

Having thus described my invention, I claim:

1. A filter segment for a disc filter including a hub, comprising:
 a base adapted for connection to the hub;
 a pair of side walls connected to said and extending longitudinally from said base in opposed spaced relationship such that said side walls include remote faces and adjacent faces which cooperate to bound a space between said side walls;
 means providing a duct means which extends longitudinally in said space from adjacent said base;
 said duct means being centrally located in said space and tapering in cross section as it extends longitudinally from said base;
 a plurality of grooves in the remote face of each of said side walls extending laterally to the longitudinal axis of their respective side wall, said grooves in each of said side walls projecting to the opposing sides of said duct means and each including a portion adjacent said duct means and an end remote from said duct means;
 said side walls each including port means for communicating said portions of said grooves with said duct means, and said remote ends of said grooves being closed from communication with said space;
 port means in said base communicating with said duct means for receiving fluid therefrom; and
 screening means over said remote faces of said side walls and peripherally over said grooves.

2. A filter segment according to claim 1, wherein the grooves in each of said side walls comprise a first set of grooves extending from said duct means towards one side thereof and a second set of grooves extending from said duct means towards the other side thereof, and said grooves each extend arcuately around said base and are closed along their bottoms to cause said port means in said side walls to be the sole discharge from said grooves into the space between said side walls.

3. A filter segment according to claim 1, wherein said grooves are constructed of increasing length as said side walls extend longitudinally from said base.

4. A filter segment for a disc filter including a hub, comprising:
 a base adapted for connection to the hub;
 a pair of sector-like, side walls connected to said base and extending longitudinally from said base in opposed spaced relationship such that said side walls include remote faces and adjacent faces which cooperate to bound a space between said side walls;
 partition means in said space providing a single, centrally disposed, flow duct which extends longitudinally in said space from adjacent said base and tapers in cross section as it extends longitudinally from said base;
 a plurality of grooves in the remote face of each of said side walls extending laterally to the longitudinal axis of their respective side wall, said grooves in each of said side walls including a first set of grooves extending to one side of said flow duct and a second set of grooves extending to the other side of said flow duct, said grooves each including an adjacent end adjacent said flow duct and a remote end which is remote from said flow duct and adjacent a lateral edge of their respective side wall;
 said side walls each including port means for communicating said adjacent ends of said grooves with said flow duct and being constructed such that said remote ends of said grooves are closed from communication with said space between said side walls;
 port means in said base communicating with said flow duct for receiving fluid therefrom; and
 screening means over said remote faces of said side walls and peripherally over said grooves.

5. A filter segment according to claim 4, further comprising:
 said flow duct tapering in both depth and width as it extends longitudinally from said base.

6. A filter segment according to claim 4, further comprising:
 said grooves being formed of arcuate configuration.

7. A filter segment according to claim 4, further comprising:
 connecting means disposed within said space on opposing sides of said flow duct for connecting said side walls.

8. A filter segment according to claim 7, further comprising:
 said connecting means comprising a plurality of elongated rib members.

9. A filter segment according to claim 7, further comprising:
 said base including a plurality of oppositely extending flange portions; and
 said flange portions being adapted to be mounted on the hub for connecting said filter segment to the hub.

10. A filter segment for a disc filter including a hub,
 a base adapted for connection to the hub;
 a pair of sector-like, side walls integral with said base and extending longitudinally from said base in opposed spaced relationship such that said side walls include remote faces and adjacent faces which cooperate to bound opposing sides of a space between said side walls;
 wall means adjacent the peripheries of said side walls interconnecting said side walls and cooperating with said side walls to peripherally enclose said space;
 partition means in said space cooperating with said adjacent faces of said side walls to bound a single, centrally disposed, flow duct which extends longitudinally in said space from adjacent said base and tapers in cross-section as it extends longitudinally from said base;
 a plurality of grooves in the remote face of each of said side walls, the grooves in each of said side walls consisting of a first set of grooves extending from said flow duct towards one side thereof and a second set of grooves extending from said flow duct towards the other side thereof, said grooves all extending arcuately around said base and having adjacent ends adjacent said flow duct and remote ends adjacent a respective one of the lateral edges of their respective side wall;

the grooves in each of said side walls being constructed of increasing length as the side wall extends longitudinally from said base;

said side walls each including port means for communicating said adjacent ends of said grooves with said flow duct and being constructed such that the bottoms of said grooves and said remote ends of said grooves are closed from communication with said space, whereby such port means are the sole discharge from said grooves into said space;

port means in said base communicating with said flow duct for receiving fluid from said flow duct; and screening means over said remote faces of said side walls and peripherally over said grooves.

11. A filter segment according to claim 10, wherein said flow duct tapers in both depth and width, and connecting means are disposed in said space for interconnecting said side walls on opposing sides of said flow duct adjacent the large diameter ends of said side walls.

12. A filter segment for a disc filter including a hub, comprising:

a base adapted for connection to the hub;

a pair of side walls connected to said base and extending longitudinally from said base in opposed spaced relationship such that said side walls include remote faces and adjacent faces which cooperates to bound a space between said side walls;

partition means in said space providing only a single flow duct, said flow duct extending longitudinally in said space from adjacent said base;

a plurality of grooves in the remote face of each of said side walls extending laterally to the longitudinal axis of their respective side wall, said grooves in each of said side walls projecting to the opposing sides of said flow duct and each including a portion adjacent said flow duct and an end remote from said flow duct;

said side walls each including port means for communicating said portions of said grooves with said flow duct, and the bottoms of said grooves and said ends of said grooves being closed from communication with said space to cause such port means to be the sole discharge from said grooves to said space;

port means in said base communicating with said flow duct for receiving fluid therefrom; and screening means over said remote faces of said side walls and peripherally over said grooves.

13. A filter segment according to claim 12, wherein said grooves include a first set of grooves extending to one side of said flow duct and a second set of grooves extending to the other side of said flow duct.

References Cited

UNITED STATES PATENTS

| | | | |
|---|---|---|---|
| 875,687 | 1/1908 | Blaisdell et al. | 210—486 |
| 2,395,225 | 2/1946 | Kurz | 210—486 |
| 2,519,506 | 8/1950 | Russell. | |
| 3,193,105 | 7/1965 | Putnam | 210—486 X |
| 3,283,906 | 11/1966 | Crane et al. | 210—486 X |

FOREIGN PATENTS

| | | |
|---|---|---|
| 951,404 | 3/1964 | Great Britain. |

REUBEN FRIEDMAN, *Primary Examiner.*

J. ADEE, *Assistant Examiner.*

U.S. Cl. X.R.

210—498